(12) United States Patent
Nagulakonda et al.

(10) Patent No.: US 8,856,126 B2
(45) Date of Patent: Oct. 7, 2014

(54) SIMPLIFYING GROUPING OF DATA ITEMS STORED IN A DATABASE

(71) Applicant: Oracle Financial Services Software Limited, Mumbai (IN)

(72) Inventors: Gangadhar Nagulakonda, Bangalore (IN); Rajaram Narasimha Vadapandeshwara, Bangalore (IN); Subramanian Ramakrishnan, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 133 days.

(21) Appl. No.: 13/648,288

(22) Filed: Oct. 10, 2012

(65) Prior Publication Data

US 2014/0101154 A1    Apr. 10, 2014

(51) Int. Cl.
*G06F 7/00* (2006.01)
*G06F 17/30* (2006.01)

(52) U.S. Cl.
USPC ............................................. 707/737

(58) Field of Classification Search
None
See application file for complete search history.

(56) References Cited

U.S. PATENT DOCUMENTS

| | | | | |
|---|---|---|---|---|
| 5,999,923 | A * | 12/1999 | Kowalski et al. | 706/47 |
| 7,870,148 | B2 * | 1/2011 | Lee et al. | 707/774 |
| 2010/0217737 | A1 | 8/2010 | Shama | |
| 2011/0078710 | A1 | 3/2011 | Ziegler | |
| 2011/0219355 | A1 | 9/2011 | Matsumoto | |
| 2012/0041921 | A1 | 2/2012 | Canaday et al. | |
| 2013/0144833 | A1 * | 6/2013 | Ivanova et al. | 707/600 |

OTHER PUBLICATIONS

Business Rules Management—How It Works, http://www.fico.com/en/Products/DMTools/Pages/Business-Rules-Management.aspx, Downloaded circa May 8, 2012, pp. 1-4.
"Wolfgang Ziegler", Event Condition Action Rules for Distributed Content Management, Dated Jul. 23, 2010, pp. 1-8.
Fico Blaze Advisor Business Rules Management, http://www.fico.com/en/Products/DMTools/Pages/FICO-Blaze-Advisor-System.aspx, Downloaded circa May 8, 2012, pp. 1-6.
Infosphere Warehouse, http://www-01.ibm.com/software/data/infosphere/warehouse/sql.html, Downloaded circa May 8, 2012, pp. 1-4.
Visual Rules Modeler, http://www.visual-rules.com/business-rules-engine-software-business-rule-management.html, Downloaded circa May 8, 2012, pp. 1-2, Bosch Software Innovations GmbH.
Websphere Operational Decision Management, http://www-01.ibm.com/software/decision-management/operational-decision-management/websphere-operational-decision-management/about/, Downloaded circa May 8, 2012, pp. 1-2.

* cited by examiner

*Primary Examiner* — Uyen Le
(74) *Attorney, Agent, or Firm* — Narendra Reddy Thappeta

(57) ABSTRACT

An aspect of the present invention simplifies grouping of data items previously stored in a database, the data items being stored in the form of rows and columns in respective tables (in the database). In one embodiment, a system displays a cross product of values from two or more columns in the form of multiple lines, where each line contains a respective value from each of the two or more columns to specify a corresponding criterion (combination of values). In response to receiving inputs indicating the respective groups for each of the lines, the system determines a group for each data item (stored in the database) based on the received inputs. A user is accordingly required to only specify the desired groups corresponding to various combinations of values of the columns to cause grouping of data items in the database.

20 Claims, 14 Drawing Sheets

Browser Dialog - Hierarchy Details

Details of Hierarchy Basel II Product Type — 350

| | |
|---|---|
| Name | H0006 |
| Short Description | Basel II Product Type |
| Long Descripiton | Basel II Product Type |
| Comments | |
| Created By | PR2USER |
| Creation Date | December 19, 2006 3:35:19 AM |
| Last Modified By | PR2USER |
| Modification Date | September 14, 2011 3:51:19 AM |
| Authorized By | PR2USER |
| Authorization Date | September 14, 2011 3:51:19 AM |
| Type | REGULAR |
| BI Enabled | Yes |
| Is Parent Child | No |
| Entity | Dimension_Basel_Product_Type — 360 |
| Attribute | Basel_Product_Type_Code — 365 |
| Level Details | |

[Back] [Close]

*FIG. 3C*

Browser Dialog - Rule Framework

Preview SQL Query

MERG INTO Fct_Non_Sec_Exposures IT USING (SELECT * FROM ( SELECT /*+ IS PARALLEL*/
FCT_NON_SEC_EXPOSURES.fic_mis_data,FCT_NOT_SEC_EXPOSURES.n_acct_skey,FCT_NON_SEC_EXPOSURES.n_gaap_skey,FCT_NON_SEC_
EXPOSURES.n_run_skey, (Fct_Non_Sec_Exposures.n_basel_asset_class_skey) AS TO, CASE WHEN (((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'DES')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'FWD')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'FTR')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'HCR')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'IPE')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'DLN')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'DES')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'MLT')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'OBF')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.f_latest_record_indicator = 'y' then
Dim_Basel_Product_Type.v_basel_prod_type_code End = 'OPT')) OR ((CASE WHEN
Dim_Basel_Customer_Type.f_latest_record_indicator='y' THEN Dim_Basel_Customer_Type.v_basel_cust_type_code END
= 'ITR') AND (Case When Dim_Basel_Product_Type.v_basel_prod_type_code End = 'ONS')) OR ((CASE WHEN

Browser - Rule Framework

▲ Linked to
Run Rule Framework >>Rule>>Rule Definition (Edit Mode)

| Folder | BIS | ... | Dataset | | Non Securitisation Expo | ... |

▲ Master Information | Properties

| ID | 1339125972878 | | Version | 0 |
| Code | RULE_NONSEC_CALC | | Active | ☑ |
| Name | Non Sec Pre-Mitigation Calc | | Type | Computation ▼ |

▲ List    Add ▼ | Move    Show Details

| | | Code | Name | Type |
|---|---|---|---|---|
| ☐ | Location | H0032 | Basel II Customer Type | Hierarchy |
| ☐ | Filter | H0021 | Exposure Defaulted Status | Hierarchy |
| ☐ | Source | H0007 | Basel II Asset Class | Hierarchy |
| ☐ | Source | H0387 | Non Sec Exposure Held at Fair... | Hierarchy |
| ☐ | Source | M0328 | MSR - Non Sec Pre Mitigation Ex | Measure |
| ☐ | Target | M0354 | MSR - Non Sec Pre Mitigation Dr | Measure |

( Next )  ( Close )

Audit Trail | Comments
▲ Audit Trail 510, 520, 500

FIG. 5B

Rule Framework

Run Rule Framework >> Rule >> Rule Definition (Edit Mode)

≽ Linked to
≽ Master Information | Properties
≋ Map
≋ Slicer
≋ Combination Mapper [6]

Source

| Exposure Defaulted | Basel II Asset class | Non Sec Exposure |
|---|---|---|
| Defaulted | Purchase Receivables | No |
| | Retail | |
| | Wholesale Exposure | |
| Home Finance | Purchase Receivables | |
| | Retail | |
| | Wholesale Exposure | |

Target Page — Page 1/1 ◁◁◁ ▽ Jump to page 585

▽ 2 of 2

| MSR - Non Sec....Drawn EAD | BP - U...EL | BP-U....Exp | Exclude |
|---|---|---|---|
| | ☐ | ☐ | ⬭ |
| | ☐ | ☑ | ⬭ |
| | ☑ | ☑ | ⬭ |
| | ☑ | ☐ | ⬭ |
| | ☑ | ☐ | ⬭ |

[ Back ]  [ Save ]  [ Close ]

Audit Trail | Comments
≋ Audit Trail

FIG. 5C

Browser - Rule Framework

Run Rule Framework >>Run>>Run Definition (Edit Mode)

Linked to
Folder: BiS

Master Information | Properties
| ID | 1305655512993 | Version | 0 |
| Code | 1305855512993 | Active | ☑ |
| Name | Capital calculation-BIS Advanced IRB Approa | Type | Base Run |

List   Add ▽ | Move   Show Details

| | | Code | Name | Type |
|---|---|---|---|---|
| ☐ | Job | 1228479817605 | CAPATIL_CONSOLIDATION | Process |
| ☐ | Job | 1281368142488 | CREDIT_RATING_PROCESSING | Process |
| ☐ | Job | 1308699026230 | NON_SEC_DATA_POPULATION | Process |
| ☐ | Job | 1308860228730 | MITIGANT_DATA_POPULATION | Process |
| ☐ | Job | 1308880522544 | NON_SEC_EXP_MITIGANT_MAPPING_POP | Process |
| ☐ | JO | 1280219476782 | NON_SEC_AIRB | Process |
| ☐ | Job | 1308846730198 | SEC_DATA_POPULATION | Process |
| ☐ | Job | 1308860632939 | SEC_EXP_MITIGANT_MAPPING_POP | Process |
| ☐ | Job | 1261524632683 | SEC_IRB | Process |
| ☐ | Job | 1261539071889 | MKT_RISK-POSITION_CONVERSION | Process |
| ☐ | Job | 1261548533473 | MKT_RISK_STD_APPROACH | Process |
| ☐ | Job | 1282681520683 | MKT_RISK_IMM_VAR | Process |
| ☐ | Job | 1281550004838 | OPS_RISK_BASIC_IND_APPROACH | Process |
| ☐ | Job | 1228310588048 | CAP_STRUCT | Process |

Next    Close

FIG. 7

SIMPLIFYING GROUPING OF DATA ITEMS STORED IN A DATABASE

BACKGROUND

1. Technical Field

The present disclosure relates to data management systems and more specifically to simplifying grouping of data items previously stored in a database.

2. Related Art

Data items are often stored in databases. For example, assuming that a database is implemented using relational technologies, the data items may be organized as rows of various tables in a relational database.

It may be required that the data items be grouped according to criteria, as suited for a specific situation. For example, banking industry is required to conform to different installments/versions (e.g., Basel II, Basel III) of regulatory standards and conformance to each version typically requires grouping (and consequent analysis) of data items according to respective criteria specified in the corresponding version, as is well known in the relevant arts.

Several aspects of the present inventions simplifies grouping of data items stored in a database while meeting one or more of requirements such as reduced probability of errors, and reduced complexity.

BRIEF DESCRIPTION OF THE DRAWINGS

Example embodiments of the present invention are described with reference to the accompanying drawings briefly described below.

FIG. 3C illustrate the manner in which a user/administrator is enabled to view details of a source/target hierarchy in one embodiment.

FIG. 4C illustrates the manner in which a user/administrator is enabled to preview the SQL queries for updating the data items in one embodiment.

FIG. 5A illustrates the manner in which a user/administrator is enabled to create a new rule for applying computations to groups of data items in one embodiment.

FIGS. 5B and 5C together illustrates the manner in which a user/administrator is enabled to specify computations to be performed for desired groups of data items in one embodiment.

FIG. 7 illustrates the manner in which a user/administrator is enabled to execute rules in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
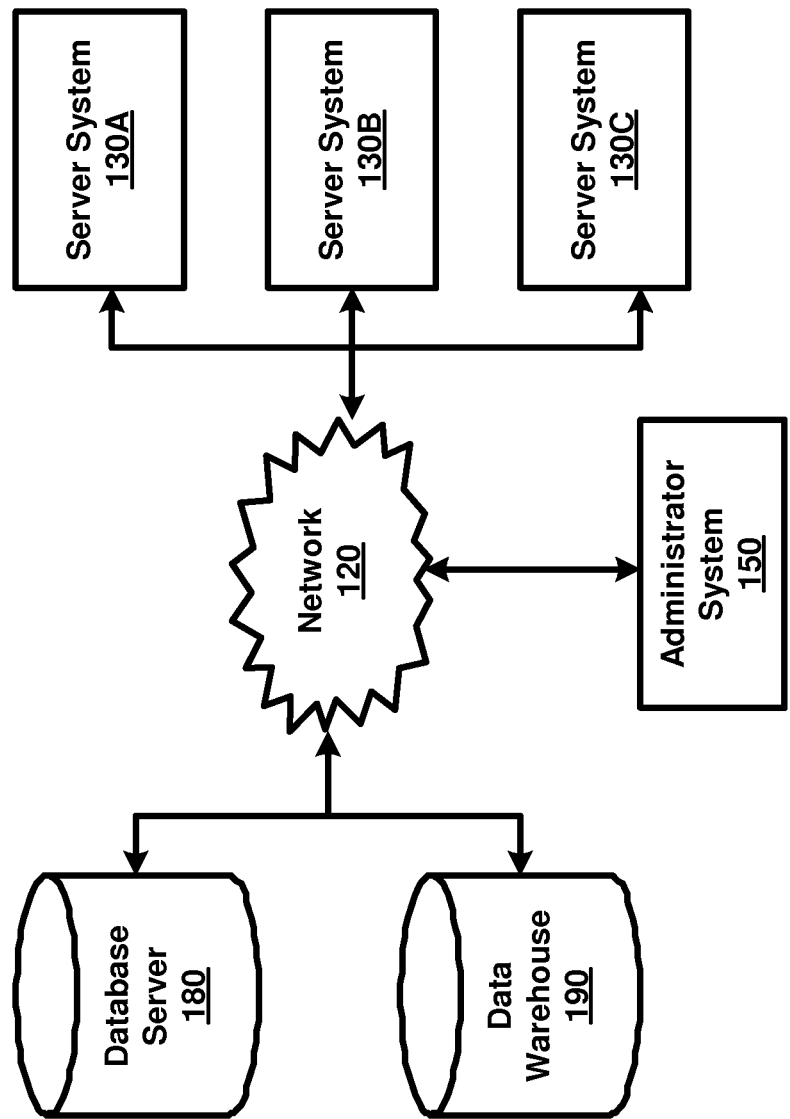
FIG. 1 is a block diagram illustrating an example environment (computing system) in which several aspects of the present invention can be implemented.

An aspect of the present invention simplifies grouping of data items previously stored in a database, the data items being stored in the form of rows and columns in respective tables (in the database). In one embodiment, a system displays a cross product of values from two or more columns in the form of multiple lines, where each line contains a respective value from each of the two or more columns to specify a corresponding criterion (combination of values). In response to receiving inputs indicating the respective groups for each of the lines, the system determines a group for each data item (stored in the database) based on the received inputs.

The determination may be performed by identifying for each combination of values (line), a corresponding set of data items having values satisfying the respective values specified in the line, and then including the identified corresponding set of data items in the group input by the user for the line.

By requiring the user to only input the groups corresponding to various combinations of values (lines) and then determining the groups for the data items based on the user inputs, the grouping of data items in a database is simplified for the user. Since all the combinations of the values are displayed, the probability of errors such as missing a specific combination is also reduced.

In one embodiment, the database includes a first column for indicating the corresponding group to which each of the data item belongs. The system accordingly generates Structured Query Language (SQL) queries designed to update the first column with a corresponding code representing the group to which the data item belongs, and then executes the generated SQL queries to cause the first column to be updated with the corresponding codes (determined based on user inputs) for the data items in the database.

According to another aspect of the present invention, the system displays a two dimensional matrix with lines/combinations of values in a first dimension and respective identifiers of the groups in a second dimension. The user inputs corresponds to a selection of an intersection of a line and an identifier of a group, with the selection indicating that data items satisfying the criteria/combination of values specified by the line are to be included in the group. In one embodiment where each of the groups is associated with a corresponding computation, the selection of the intersection indicates that the respective computation for the group is to be performed for data items satisfying the criteria specified by the line.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing network 120, server systems 130A-130C, administrator system 150, database server 180 and data warehouse 190.

Merely for illustration, only representative number/type of systems is shown in FIG. 1. Many environments often contain many more systems, both in number and type, depending on the purpose for which the environment is designed. Each block of FIG. 1 is described below in further detail.

Network 120 provides connectivity between server systems 130A-130C, administrator system 150, database server 180 and data warehouse 190, and may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 120.

Each of server systems 130A-130C represents a server, such as a web/application server, executing business/enterprise applications capable of performing tasks requested by end users (using client systems, not shown in FIG. 1). In response to receiving requests from client systems, each server system performs the tasks specified in the requests and sends the result of performance of the tasks to the requesting client system. Each server system may use data stored internally (for example, in a non-volatile storage/hard disk within the server), external data (e.g., maintained in database server 180) and/or data received from external sources (e.g., from the user) in performing such tasks.

Each of database server 180 and data warehouse 190 represents a non-volatile (persistent) storage facilitating storage and retrieval of a collection of data by business/enterprise applications executing in server systems 130A-130C. Database server 180 maintains transaction data related to business transactions (for example, the sale transaction, the current inventory, etc.) in real time. Database server 180 generally enables the addition, modification, and deletion of the stored data by different users simultaneously. In contrast, data warehouse 190 stores historical data related to the transactions performed by the business/enterprise applications such as the total sales for each region/year, etc. Data warehouse 190 generally contains data extracted from different external data sources (such as database server 180) at pre-defined intervals, for example, at end of day, month, etc.

In one embodiment described below, each of database server 180 and data warehouse 190 is implemented using relational database technologies and therefore provides storage and retrieval of data using structured queries such as Structured Query Language (SQL). SQL refers to a special-purpose, generally non-procedural language that supports the definition, manipulation, and control of data in systems implementing relational database technologies. However, database server 180 and data warehouse 190 may be implemented using other technologies (e.g., procedural language, hierarchical databases) in alternative embodiments.

Thus, data stored in each of database server 180 and data warehouse 190 is organized in the form of one or more databases, each database containing one or more tables. Each table contains data organized in the form of rows and columns, as is well known in the relevant arts. In the example illustrations of below, the term "data item" refers to the data stored related to a single transaction. Each data item may be stored as a corresponding row in a table (storing the transactions), or as related data stored in multiple rows in two or more tables linked by primary and foreign keys.

As noted above in the Background Section, it may required that the data items stored in database server 180 and/or data warehouse 190 be grouped according to desired criteria. Administrator system 150, provided according to several aspects of the present invention, simplifies grouping of data items stored in a database, as described below with examples.

3. Grouping Data Items Stored in a Database

Figure 2:
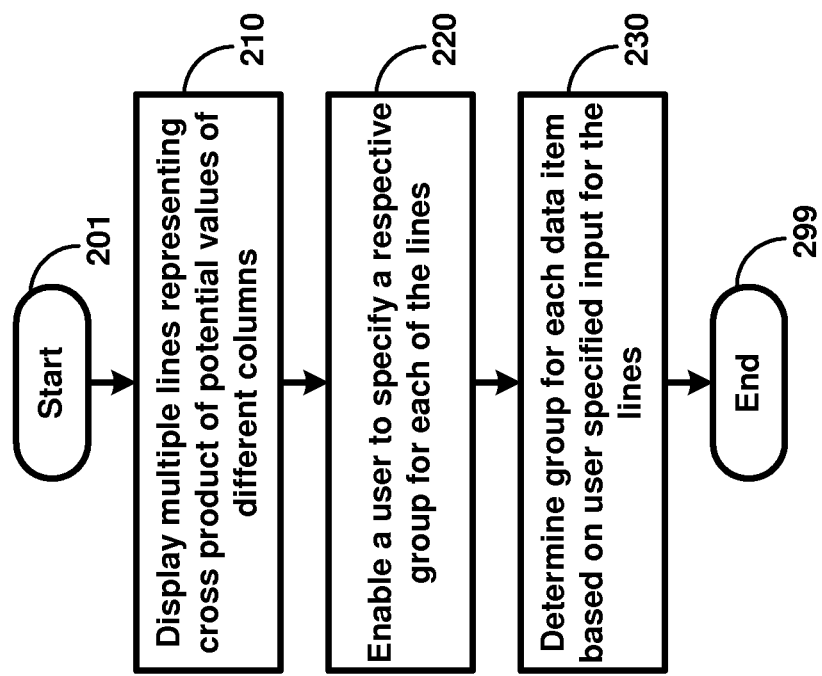
FIG. 2 is a flow chart illustrating the manner in which grouping of data items stored in a database is simplified according to an aspect of the present invention.

FIG. 2 is a flow chart illustrating the manner in which grouping of data items stored in a database is simplified according to an aspect of the present invention. The flowchart is described with respect to FIG. 1 merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, administrator system 150 displays multiple lines representing cross product of the sets of potential values (of interest) of different columns. The columns containing information, which form the basis for specifying grouping criteria, are used in such display. A cross product is defined as the set of combinations of the potential values of interest, where each combination contains one value from each set of potential values of that column. Thus, for two sets A and B, the cross product is defined as the set of all pairs, where the first element in the pair is from set A and the second element in the pair is from set B. The number of lines displayed is equal to the multiplication of the number of potential values in each classification (that is, m×n, if set A contains m elements and set B contains n elements).

In step 220, administrator system 150 enables a user/administrator to specify a respective group for each of the lines. In other words, the user/administrator is enabled to specify the desired group for each combination of potential values of interest of the columns.

In step 230, administrator system 150 determines the group for each data item (stored in database) based on user specified input for the lines. A data item is included in a group, if the data item satisfies the combination of values of any line specified for that group. Thus, by selecting the same group for multiple lines, all data items satisfying the combination of values specified in each of such lines, are included in that group. The flow chart ends in step 299.

Thus, by displaying the cross product of potential values of interest, the user/administrator may be methodically required to consider all relevant possibilities in specifying the grouping criteria, thereby reducing probability of errors. The mental effort of the user/administrator for grouping of data items may accordingly be simplified.

The flowchart of FIG. 2 can be applied to various environments. The description is continued with respect to conformance of banking industry to different versions of regulatory standards.

4. Regulatory Standards in Banking Industry

As also briefly noted in Wikipedia, the Basel Committee on Banking Supervision (BCBS) is a committee of banking supervisory authorities that was established by the central bank governors of the Group of Ten countries in 1974. It provides a forum for regular cooperation on banking supervisory matters. Its objective is to enhance understanding of key supervisory issues and improve the quality of banking supervision worldwide. The Committee also frames guidelines and standards in different areas—some of the better known among them are the international standards on capital adequacy, the Core Principles for Effective Banking Supervision and the Concordat on cross-border banking supervision.

As is also well known, BCBS has provided various installments/versions of the regulatory requirements, which are commonly known as Basel I, Basel II and Basel III. There are material differences among the different versions. For example, Basel III defines various groups of capital and corresponding compliance requirements. The following grouping and related changes in comparison with Basel II, are illustrative, for the present purpose:

Tier 1 capital: the predominant form of Tier 1 capital must be common shares and retained earnings;
Tier 2 capital instruments will be harmonized;
Tier 3 capital will be eliminated.

It may accordingly be appreciated that data items need to grouped for purpose of compliance with Basel III. It may be appreciated that information corresponding to each transaction may be stored as a data item, and grouping entails classifying the data items according to the Basel III requirements. In the example described below, such grouping is performed based on prior grouping in compliance with Basel II. However, in alternative embodiments, the grouping can be based on actual values representing the transactions.

5. Illustrative Example

Figure 5B:
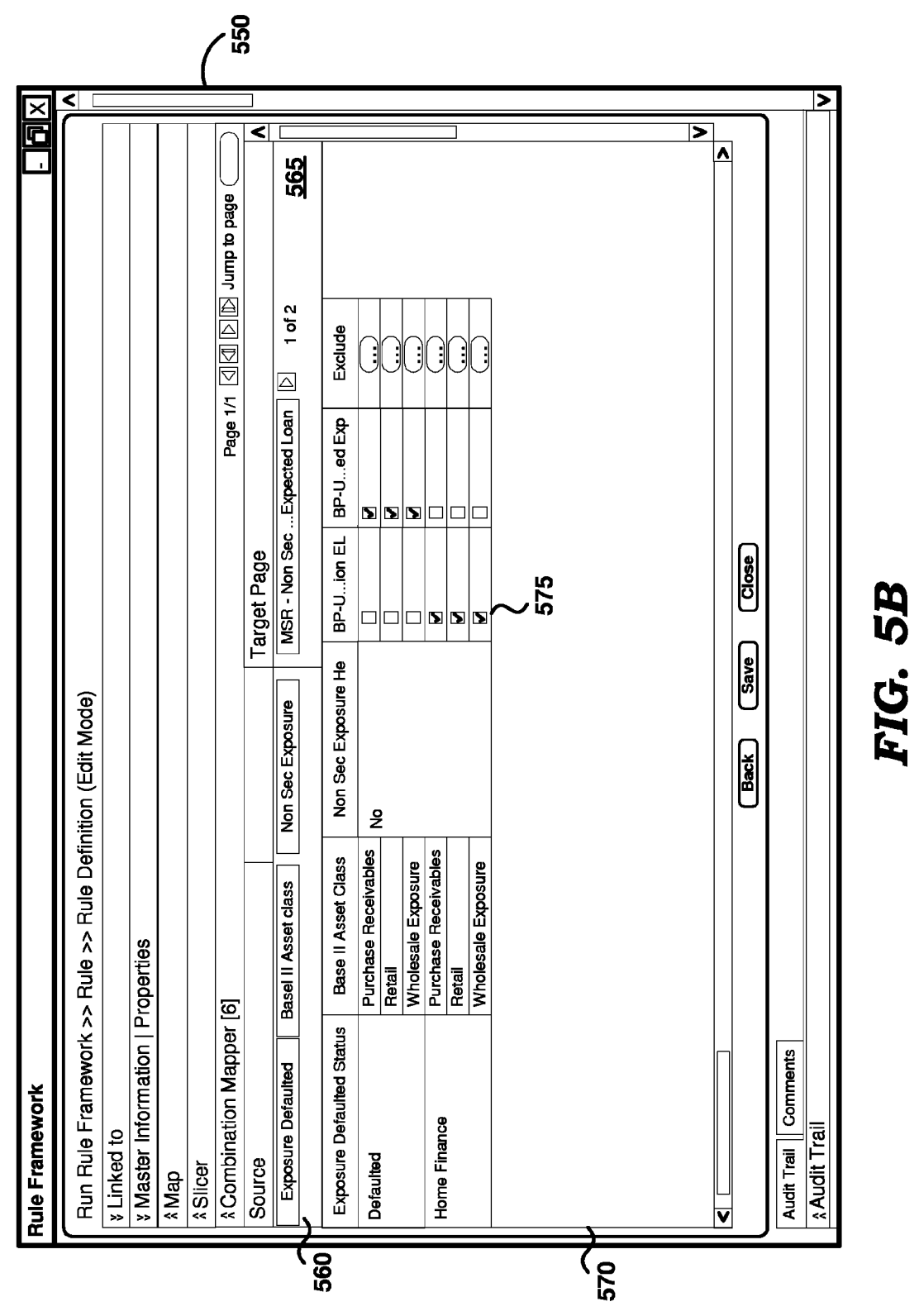
Figure 6:
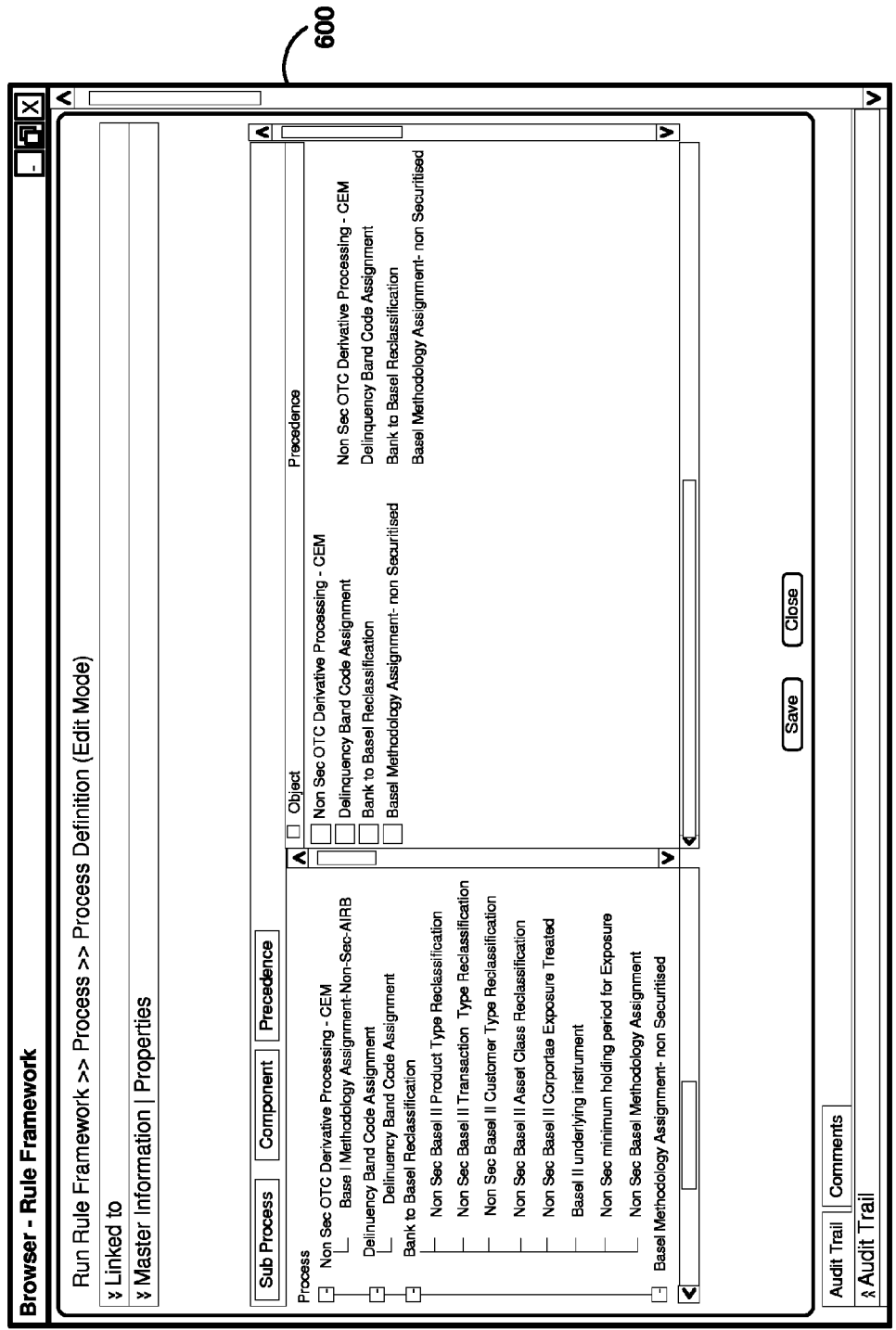
FIG. 6 illustrates the manner in which a user/administrator is enabled to combine and process multiple rules in one embodiment.

FIGS. 3A-3C, 4A-4C, 5A-5C, 6 and 7 together illustrate the manner in which grouping of data items in a database is simplified in one embodiment. Broadly, the Figures illustrate user interfaces provided by a rule framework. In particular, FIGS. 3A-3C, 4A-4D and 5A-5B illustrate the manner in which new rules are created by a user/administrator. FIG. 6 illustrates the manner in which rules can be combined and processed. FIG. 7 illustrates the execution of the rules. Each of the Figures is described in detail below.

Figure 3A:
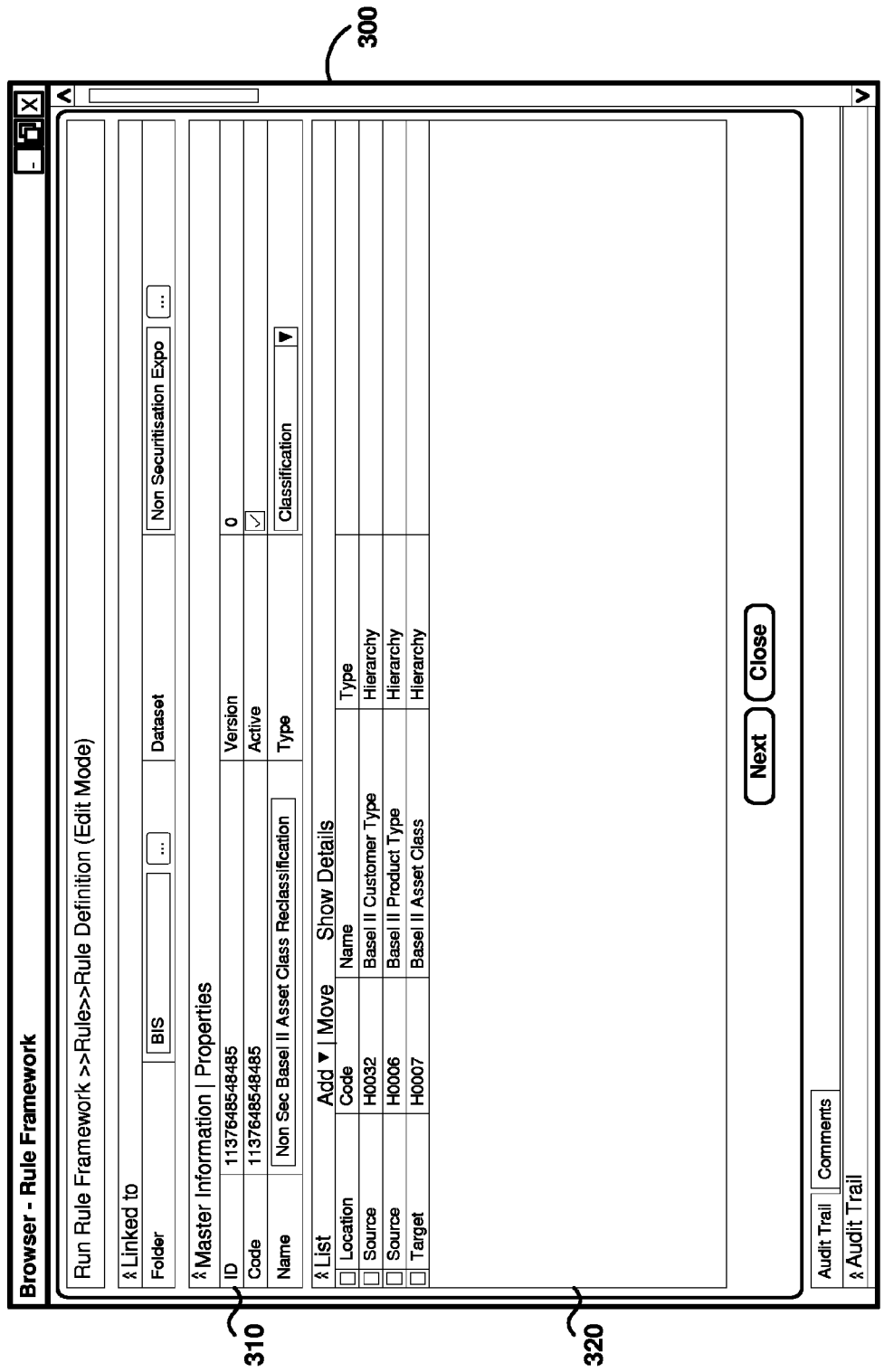
FIG. 3A illustrates the manner in which a user/administrator is enabled to create a new rule for specifying the desired criteria for grouping of data items in one embodiment.

FIG. 3A illustrates the manner in which a user/administrator is enabled to create a new rule for specifying the desired criteria for grouping of data items in one embodiment. Display area 300 (and also 330, 350, 400, 440, 460, 500, 550, 600 and 700) depicts a portion of a user interface provided on a display unit (not shown in FIG. 1) associated with administrator system 150. In one embodiment, each display area corresponds to a browser displaying respective web pages provided by administrator system 150. The web pages are provided in response to an administrator of the enterprise sending appropriate requests using the browser in administrator system 150.

Display area 310 indicates that a new rule named "Non Sec Basel II Asset Class Reclassification" is sought to be created and the type of the rule is classification, i.e., specifying the groups according to a desired grouping criteria. Display area 320 displays the hierarchies selected by the user for grouping. Each hierarchy represents a corresponding set of potential values of interest in a column that are organized in the form of a tree data structure, well known in the arts. Each data item stored in the database (in database server 180 or data warehouse 190) may be associated with one of the values in each hierarchy.

Figure 3B:
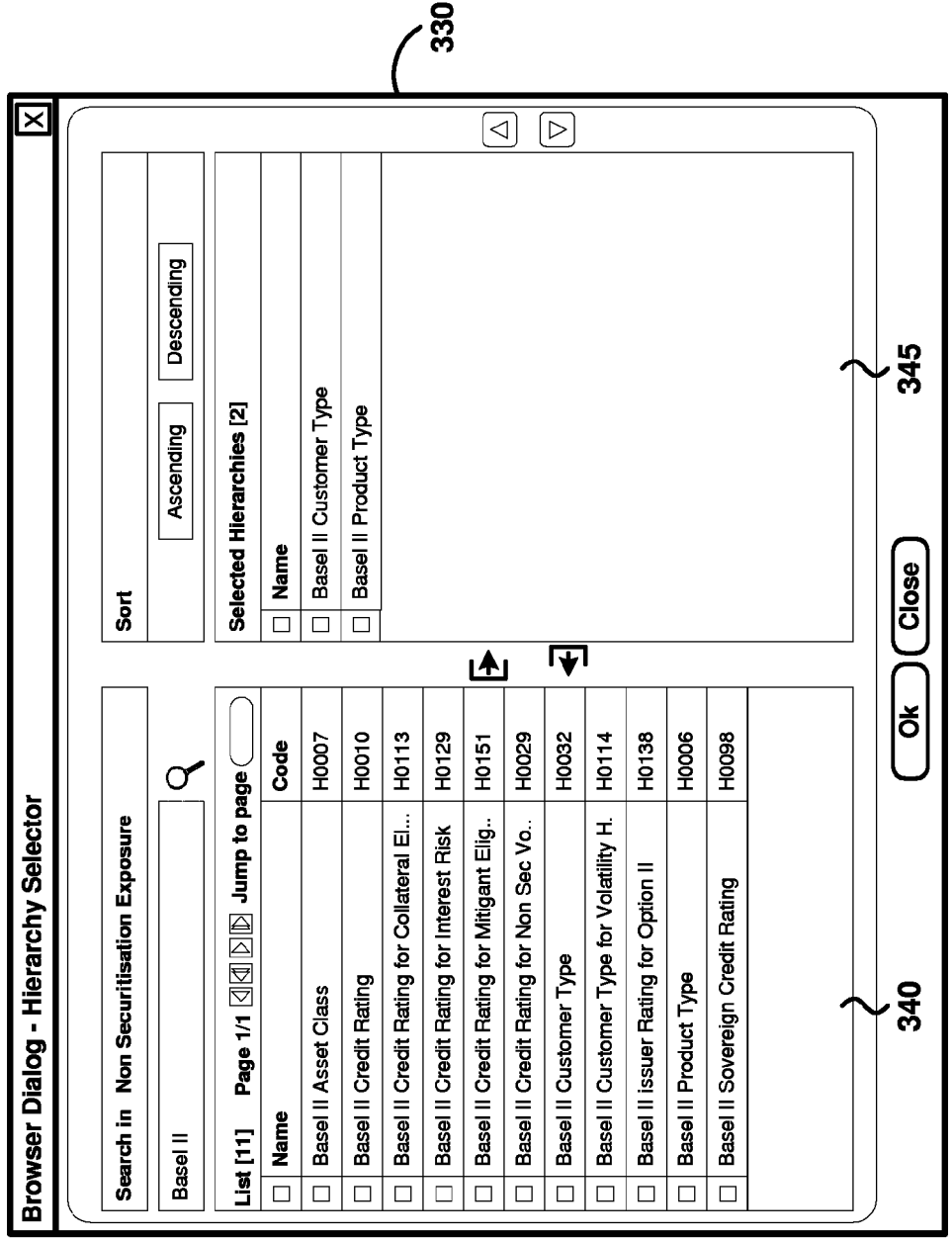
FIG. 3B illustrates the manner in which a user/administrator is enabled to select a source/target hierarchy in one embodiment.

In one embodiment, the administrator selects various "source" hierarchies that specify the existing values in columns in the tables in a database, and then also selects one or more "target" hierarchies according to which data items are sought to be grouped. FIG. 3B illustrates the manner in which a user/administrator is enabled to select a source/target hierarchy in one embodiment. Display area 330 depicts a portion of a user interface that may be provided as a pop-up window (overlaying display area 300), in response to the administrator selecting the "Add" option in display area 320. Display area 340 enables the administrator to select one or more desired source/target hierarchies, with display area 345 showing the selected hierarchies. The administrator may then click on the "Ok" button to confirm selection of the selected hierarchies.

An administrator may also view the details of each hierarchy. FIG. 3C illustrate the manner in which a user/administrator is enabled to view details of a source/target hierarchy in one embodiment. Display area 350 depicts a portion of a user interface that may be provided as a pop-up window (overlaying display area 300), in response to the administrator selecting a source/target hierarchy (Basel II Product Type) in display area 320. In particular, display areas 360 and 365 respectively indicate the name ("Dimension_Basel_Product_Type") of the entity/table and the name ("Basel_Product_Type_Code") of the attribute/column in the database storing the values of the selected hierarchy. Thus, the interfaces of FIGS. 3B and 3C facilitates an administrator to select the desired source and target hierarchies.

Referring back to FIG. 3A, it may be observed that display area 320 indicates that the administrator has selected (using the pop-up window of FIG. 3B) "Basel II Customer Type" and "Basel II Product Type" as the source hierarchies, while the "Based II Asset Class" is shown selected as the target hierarchy. Thus, the administrator wishes to group the data items into different values of the Basel II Asset Class based on the potential values in the Basel II Customer Type and Basel II Product Type columns. In response to the user/administrator clicking/selecting the "Next" button, administrator system 150 provides a user interface that simplifies grouping of data items according to the target hierarchy, as described below with examples.

6. Displaying Cross Product of Values

Figure 4A:
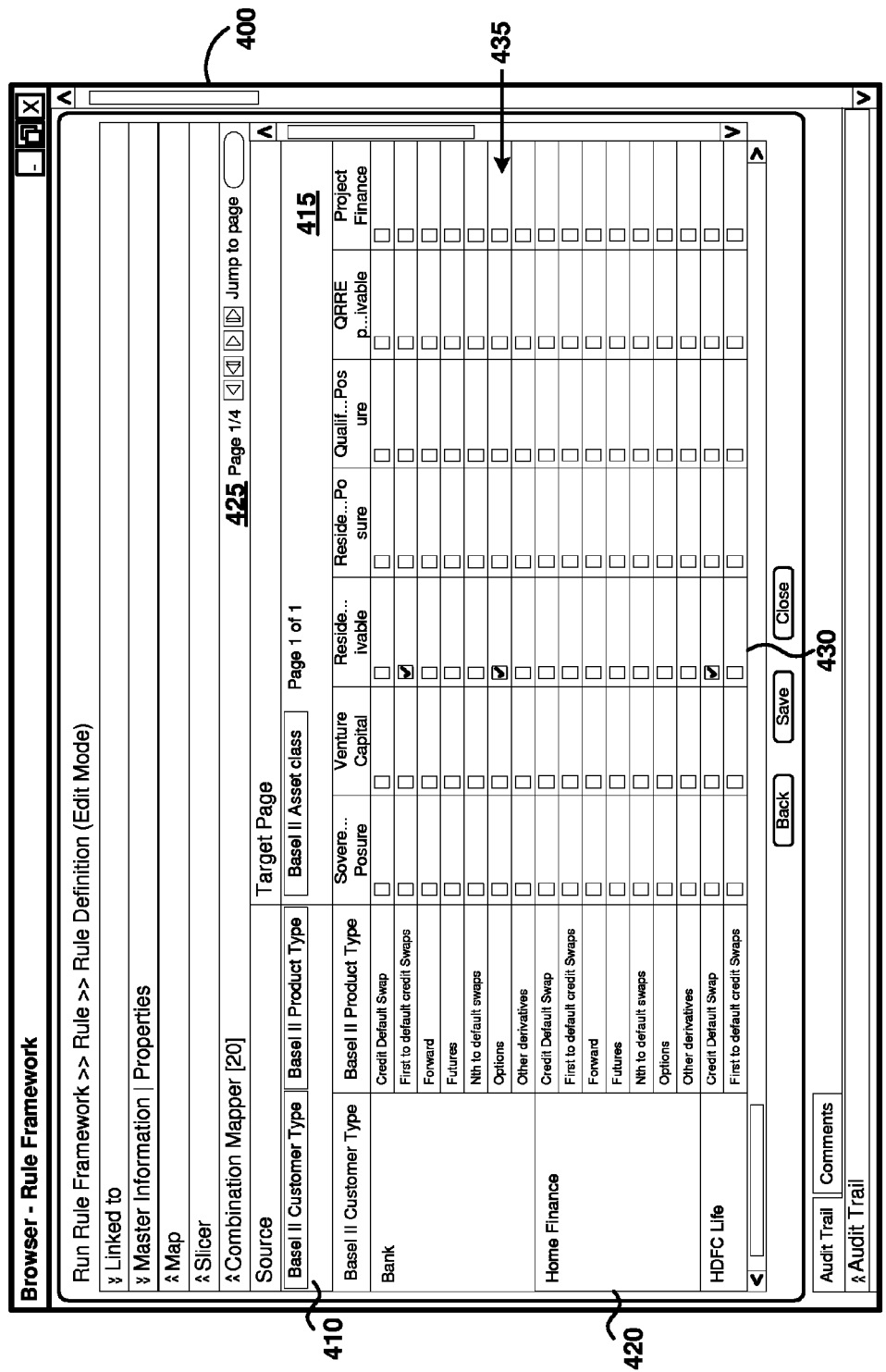
FIG. 4A illustrates the manner in which a user/administrator is enabled to specify the desired groups of data items in one embodiment.

FIG. 4A illustrates the manner in which a user/administrator is enabled to specify the desired groups of data items in one embodiment. Display area 400 depicts a portion of a user interface that is displayed in response to a user/administrator selecting the "Next" button in FIG. 3A, after selecting the hierarchies shown in display area 320. Display area 410 accordingly indicates the source hierarchies "Basel II Customer Type" and "Basel II Product Type", while display area 415 indicates the target hierarchy "Basel II Asset Class".

Display area 420, provided according to an aspect of the present invention, displays multiple lines representing the cross product of the values of interest in the selected source hierarchies. Thus, the set of values "Credit Default Swap", "First to default credit Swaps", etc. for Basel II Product Type is shown repeated for each value such as "Bank", "Home Finance", "Life Insurance" for Basel II Customer Type, thereby forming the cross product. Only a few representative lines are shown in display area 420, though in a typical implementation, several hundred lines may be displayed along with horizontal and vertical scroll bars, as will be apparent to one skilled in the relevant arts.

Figure 4B:
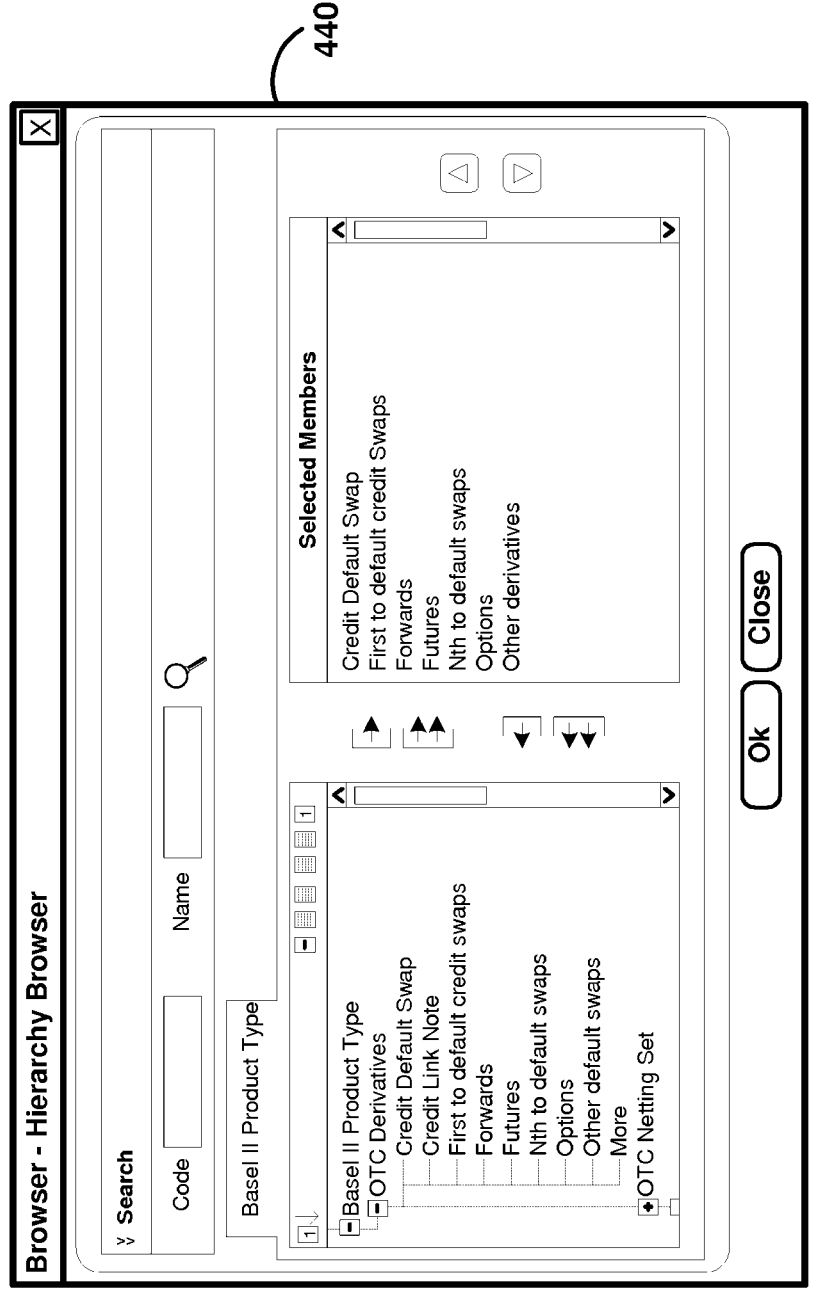
FIG. 4B illustrates the manner in which a user/administrator is enabled to manually select the desired set of potential values of a column (hierarchy) in one embodiment.

It may be appreciated that an administrator may select only the set of potential values that are of interest for the group criteria. FIG. 4B illustrates the manner in which a user/administrator is enabled to manually select the desired set of potential values of a column (hierarchy) in one embodiment. Display area 440 depicts a portion of a user interface that may be provided as a pop-up window (overlaying display area 400), in response to a user selecting the corresponding hierarchy in display areas 410/415. Display area 440 enables the administrator to select one or more values (shown under "Selected Members") for a source/target hierarchy (such as "Basel II Product Type" shown here). The administrator may similarly select the values for each of the source and/or target hierarchies of interest.

Referring back to FIG. 4A, display area 420 is shown providing a cross product of the values selected by the administrator using the interface of FIG. 4B. Display area 420 is also shown providing, according to another aspect of the present invention, the various values in the target hierarchy as vertical columns (such as 430) for each of the displayed lines. Each of the values in the target hierarchy can be viewed as specifying an identifier of a corresponding group (of data items).

Thus, display area 420 displays a two-dimensional matrix containing cells at the intersection of lines corresponding to different combinations/criteria and vertical columns corresponding to identifiers of the different groups (i.e., values of the target hierarchy). For illustration, the combinations are shown in the vertical dimension, while the identifiers are shown displayed in the other horizontal dimension. However, in alternative embodiments, the combinations may be displayed in the horizontal dimension with the identifiers displayed in the vertical dimension, as will be apparent to one skilled in the relevant arts, by reading the disclosure herein.

7. Displaying Multiple Sets of Values of Interest

It may be appreciated that the user may use the horizontal and vertical scroll bars in display area 420 to view more/other portions of the two-dimensional matrix. However, when the number of lines and/or the number of vertical columns are large, the matrix may be displayed in the form of multiple pages, each page containing a corresponding portion of the matrix. Only a single page (portion of the matrix) selected by the user is made available in display area 420 at any time instance. Display area 425 depicts various buttons that enables the user to navigate to the first page (labeled as "<<"), previous page "<", next page ">", last page ">>" and jump to a specific page.

An aspect of the present invention provides the different pages of the matrix corresponding to different values of a selected source hierarchy. Thus, a first page contains combinations/lines having only a first value for the source hierarchy (though the other selected hierarchies may have multiple values in the combinations), while a second page contains combinations having only a second value for the source hierarchy (with the multiple values from other selected hierarchies repeated in the combinations). Such a feature may be desirable when the number of source hierarchies selected by the user is more than two (for example, 3 or 4) or when one of the source hierarchies has few values (for example, less than 4).

For example, in a scenario that a user selects a third source hierarchy having two values A and B in addition to the two source hierarchies "Basel II Customer Type" and "Basel II Product Type", administrator system 150 first displays a page containing the combinations of the two source hierarchies currently shown in display area 420 along with the value "A" for the selected third hierarchy. In response to a user navigating to a second page, the same combinations of the two source hierarchies is shown along with the value "B" for the selected third hierarchy. A user is accordingly required to specify the groups corresponding to only one value of the third hierarchy in each page, thereby further simplifying the grouping of data items in a database.

Thus, a cross product of the different sets of values (hierarchies) of interest is displayed to a user/administrator. It may be appreciated that such a display of the cross product facilitates even business users of the enterprise to specify the respective groups for each lines. The manner in which a user/administrator specifies the inputs for grouping the data items in a database using the user interface of display area 420 is described below with examples.

8. Specifying User Inputs

Referring again to FIG. 4A, it may be observed that each cell (corresponding to an intersection of a line and a vertical column) is shown containing a corresponding check box that may be selected by the user/administrator in one embodiment. A selection of a checkbox in a cell (such as, at the intersection of line 435 and vertical column 430) indicates that the data items that satisfy the combination/criteria in the line (for example, having Basel II Customer type as "Bank" and Basel II Product Type as "Options" for line 435) are to be include in a group identified by the value/identifier indicated by the vertical column (for example, the value "Residual Deliverable" for Basel II Asset Class for vertical column 430).

It may be appreciated that each line in display area 420 of FIG. 4A represents an "AND" condition whereby values of the different columns indicated in the lines are all required to be satisfied by a data item for inclusion in the user indicated group. Though "AND" conditions are sufficient to perform grouping of data items in most business scenarios, it may be desirable that an ability to specify OR" conditions be also provided to the user/administrator when grouping data items. An "OR" condition indicates that a data item is to be include in a group even when the value of column matches multiple values specified in the combinations/lines.

An aspect of the present invention enables a user to use the paging feature noted above to specify OR conditions based on the values of the source hierarchy associated with the different pages. A user by selecting the same checkbox (group) in two different pages indicates that a data item having a value in the column matching either of the two values associated with the two different pages is to be included in the group.

For the above noted example with a third source hierarchy with two values A and B, a user by selecting the checkbox at the intersection of line 435 and vertical column 430 in both the pages corresponding to the values A and B for the third source hierarchy indicates that the data items having value "Bank" for the Basel II Customer type, value "Options" for Basel II Product Type (both indicated by line 435) and the two values "A" or "B" for the third hierarchy (as indicated by the selection in the two pages) are to be include in the group identified by the value/identifier "Residual Deliverable" for Basel II Asset Class (as indicated by vertical column 430).

The description is continued assuming that a user/administrator is allowed to select only one checkbox (corresponding to a desired combination/line) in each of the vertical columns. However, in alternative embodiments, an administrator may be allowed to select multiple lines for a single vertical column (e.g. 430) to indicate that all the data items matching each of the combinations/lines are to be included in the corresponding group/column (e.g. "Residual Deliverable").

It may be further appreciated that for a single combination/line, a user/administrator is allowed to only select a single checkbox (corresponding to the vertical column/group to which the data items are to be included) in that line. However, the administrator may be allowed to select multiple vertical columns (for a same line) in other scenarios/situations. For example, when applying computations to groups of items, it may be desirable that the user be facilitated to apply a series computations (with a next computation performed on the output of a previous computation) by selecting multiple checkboxes/computations for the single combination/line.

In another scenario, administrator system 150, in response to a user selecting multiple target hierarchies (using the user interfaces of FIGS. 3A and 3B), may display the different sets of values of the target hierarchies in adjacent sets of vertical columns for each combination/line. As such, the user may be allowed to select multiple vertical columns corresponding to desired values/groups for different hierarchies for a single combination/line (though the user may still be restricted to select only a single vertical column for each hierarchy).

An administrator may similarly specify the data items to be grouped for other values of the target hierarchy by selecting the desired checkboxes in the appropriate vertical columns. In response to the administrator selecting the "Save" button and then executing the rule (described below with respect to FIGS. 6 and 7), administrator system 150 determines the group for each data item based on user specified input (selected checkboxes) for the lines displayed in display area 420. Administrator system 150 may also update the data items to indicate the determined group to which each data item belongs, as described below with examples.

9. Updating Data Items

In one embodiment, the target hierarchy is represented in the form of a column in the table storing the data items, with the value selected in the target hierarchy being stored in the column for each of the rows (thereby indicating the group to which each data item belongs). Thus, for each data item having the Basel II Customer Type as "Bank" and the Basel II Product Type as "Options" (row 435), the value "Residual Deliverable" (or any other code representing the value) is stored in a column representing the Basel II Asset Class in the table.

In one embodiment, the update of the data items is performed by generating queries according to SQL and then executing the generated SQL queries in the database (either in database server 180 or data warehouse 190).

FIG. 4C illustrates the manner in which a user/administrator is enabled to preview the SQL queries for updating the data items in one embodiment. Display area 460 depicts a portion of a user interface that may be provided as a pop-up window (overlaying display area 400), in response to a user selecting a corresponding button/link (not shown) in display area 400 Display area 460 depicts sample SQL queries that may be used to update the data items corresponding to the selections of the administrator in display area 420. The administrator may check the queries to determine whether the desired grouping of data items will be performed when the queries are later generated and executed (when the rule is run/performed).

Thus, an administrator is facilitated to create new rules (and also to edit existing rules) using the interfaces of FIGS. 3A-3C and 4A-4C. An aspect of the present invention facilitates a user/administrator to apply different sets of computations to desired groups of items. The manner in which a rule for applying computations to groups of items is created by an administrator is described below with examples.

10. Applying Computations to Groups of Items

FIGS. 5A-5C together illustrates the manner in which a user/administrator is enabled to create rules for applying computations to groups of items in one embodiment. Each of the Figures is described in detail below.

FIG. 5A illustrates the manner in which a user/administrator is enabled to create a new rule for applying computations to groups of data items in one embodiment. Display area 500 is similar to display area 300 described above with respect to FIG. 3A. Display area 510, similar to display area 310, indicates that a new rule named "Non Sec Pre-Mitigation Calc" sought to be created and the type of the rule is computation, i.e., for applying computations to groups of items (grouped according to a desired grouping criteria).

Display area 520, similar to display area 320, displays the various hierarchies selected by the user for grouping. In particular, display area 520 indicates that the administrator has selected (for example, using the interface of FIG. 3B) the source hierarchies named "Exposure Defaulted Status", "Basel II Asset Class", and "Non Sec Exposure Held at Fair Value Indicator". Display area 520 also indicates that the administrator has selected the measures named "MSR—Non Sec Pre Mitigation Expected Loan" and "MSR—Non Sec Pre Mitigation Drawn EAD" as the targets. Each measure represents a corresponding table and column in the database that is to be updated with the result of performing an associated set of computations. Each measure may be associated with multiple computations (with each computation implemented as a corresponding business processor) to be performed based on the criteria.

Display area 520 further indicates that a filter has been specified based on the Basel II Customer Type hierarchy. A filter enables the user to select the desired values to be used in the combinations/lines for the corresponding hierarchy (Basel II Customer Type). In particular, the user is enabled to select the desired values of the hierarchy based on conditions specified as part of the filter, instead of the manually selecting the desired values using the interface of FIG. 4B, as noted above). The administrator after selecting the above noted filters, source and target hierarchies, then clicks on the "Next" button to view the user interface for specifying the groups of data items according to the desired grouping criteria.

FIGS. 5B and 5C together illustrates the manner in which a user/administrator is enabled to specify computations to be performed for desired groups of data items in one embodiment. Display area 550 depicts a portion of a user interface (similar to display area 400) that is displayed in response to a user/administrator selecting the "Next" button in FIG. 5A, after selecting the hierarchies shown in display area 520. Display area 560 accordingly indicates the source hierarchies "Exposure Defaulted Status", "Basel II Asset Class", and "Non Sec Exposure Held at Fair Value Indicator", while display area 565 indicates the target as "MSR—Non Sec Pre Mitigation Expected Loan".

An aspect of the present invention provides the set of values corresponding to multiple (here, two) selected target hierarchies in corresponding pages as separate two-dimensional matrices (though in an alternative embodiment, the sets of values may be displayed as adjacent sets of columns, as noted above). Display area 565 accordingly shows only one of the selected two target hierarchies (as also indicated by the text "1 of 2" in display area 565), and display area 570 is shown displaying the values/computations corresponding to the target hierarchy "MSR—Non Sec Pre Mitigation Expected Loan". A user may click on the next button (labeled as ">") shown in display area 565 to view the two-dimensional matrix for the next target hierarchy "MSR—Non Sec Pre Mitigation Drawn EAD".

Referring to FIG. 5C, display area 585 indicates that the user us currently specifying the inputs for the values of the target hierarchy "MSR—Non Sec Pre Mitigation Drawn EAD". A user may select the previous button (labeled as "<") shown in display area 585 to view the matrix for the previous target hierarchy "MSR—Non Sec Pre Mitigation Expected Loan". Similarly, the set of values/computations corresponding to multiple target hierarchies may be provided on corresponding pages (as separate matrices). Since the user is required to focus only on the inputs for a single target hierarchy in each page, user's task of grouping data items (and/or applying corresponding computations) is further simplified.

Display area 570 is shown displaying multiple lines representing the cross product of the values of interest in the selected source hierarchies Display area is similar to display area 420 described in detail above with respect to FIG. 4A, and accordingly the description is not repeated here for conciseness. It may be observed that the different business processors/computations associated with each measure/target hierarchy are shown as corresponding vertical columns in the two dimensional matrix displayed in display area 570.

In other words, each computation may be viewed as being specified for a corresponding group of data items (determined based on the user inputs in the checkboxes shown in display area 570). For example, column 575 indicates that the computation/business processor "BP-U . . . ion EL" is to be performed on the group of data items that have the value "Home Finance" for the Exposure Defaulted Status hierarchy, any of the values "Purchase Receivables", "Retail", "Wholesale Exposure" for the Base II Asset Class hierarchy, and the value "No" for the Non Sec Exposure Held at Fair Value Indicator hierarchy.

Thus, an administrator is facilitated to create new rules (and also to edit existing rules) for grouping and/or applying computations to data items using the interfaces of FIGS. 4A-4C and/or FIGS. 5A-5C. The administrator may then run/perform the rules to cause updating of the data items into the corresponding groups (determined based on used inputs), as described below with examples.

11. Running Rules

FIG. 6 illustrates the manner in which a user/administrator is enabled to combine and process multiple rules in one embodiment. Display area 600 enables the administrator to combine multiple rules into a single process that may be later executed together. The processes are shown as being organized in the form of a hierarchy, with parent processes containing sub-processes at multiple levels.

It should be appreciated that such a process hierarchy facilitates users/administrators to determine rules to execute concurrently and to put a solve-order (the order in which the rules are to be executed) among rules in the hierarchy. In one embodiment, the rule framework also enables (by providing appropriate user interfaces, not shown) to add custom components as tasks to be performed in the hierarchy. After defining the desired process hierarchy, an administrator may then execute the hierarchy of rules and tasks.

FIG. 7 illustrates the manner in which a user/administrator is enabled to execute rules in one embodiment. Display area 700 enables the administrator to add a single execution of a process hierarchy as a corresponding job to be performed. After defining the desired set of jobs (each job corresponding to a process hierarchy containing rules and tasks), the administrator may execute the run to cause execution of the rules.

Thus, in response to execution of a rule specified in the user interface of FIG. 4A, administrator system 150 determines the group to which each data item belongs based on the user inputs specified in the interface of FIG. 4A, generates the SQL queries shown in FIG. 4C, and then executes the generated SQL queries to cause update of the data items with the respective determined group identifier (or corresponding code).

It should be further appreciated that the features described above can be implemented in various embodiments as a desired combination of one or more of hardware, executable modules, and firmware. The description is continued with respect to an embodiment in which various features are operative when the instructions in the executable modules are executed.

12. Digital Processing System

Figure 8:
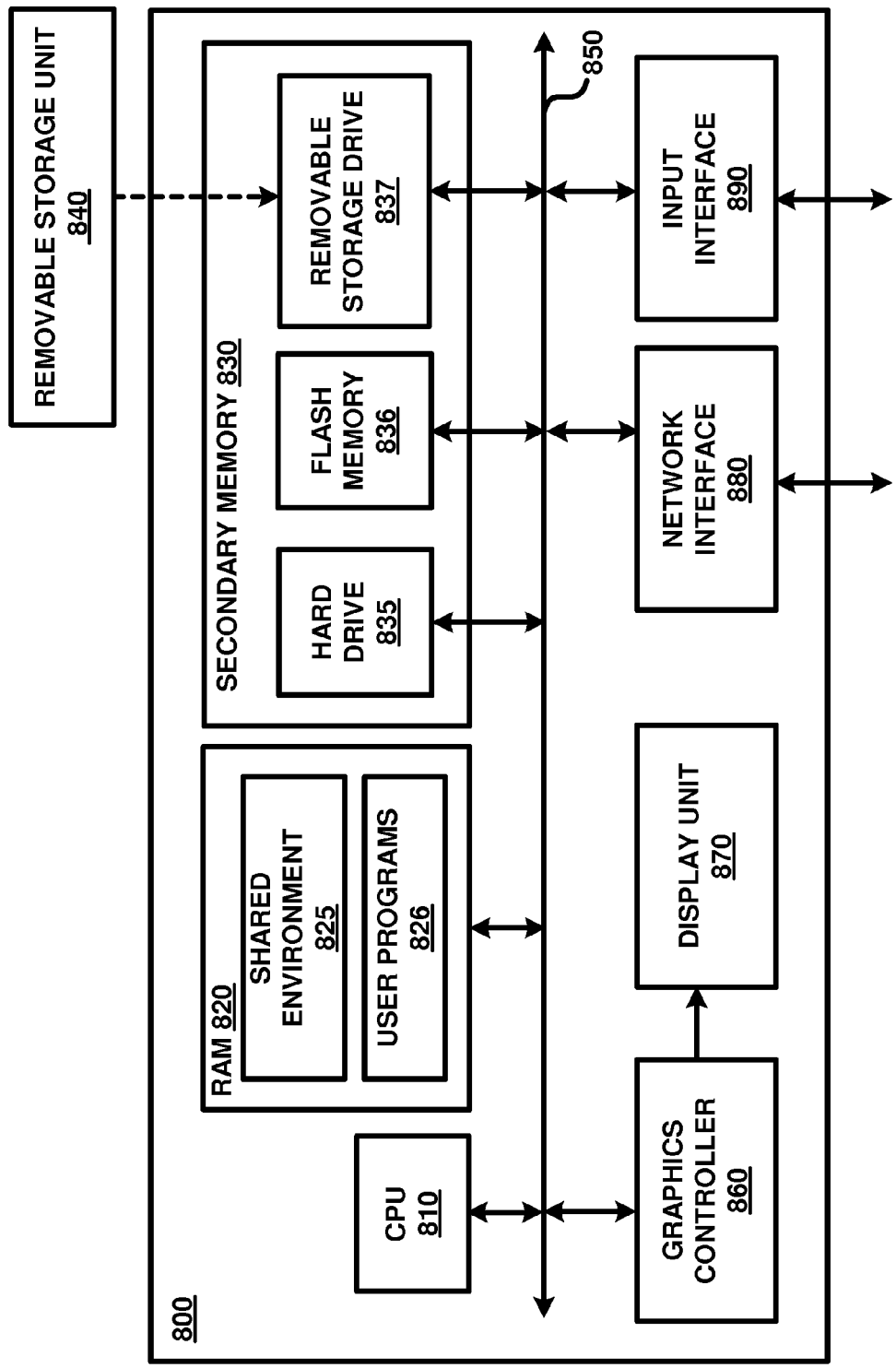
FIG. 8 is a block diagram illustrating the details of digital processing system 800 in which several aspects of the present invention are operative by execution of appropriate software instructions.

FIG. 8 is a block diagram illustrating the details of digital processing system 800 in which several aspects of the present invention are operative by execution of appropriate software instructions. Digital processing system 800 corresponds to administrator system 150.

Digital processing system 800 may contain one or more processors (such as a central processing unit (CPU) 810), random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850. RAM 820 is shown currently containing software instructions constituting shared environment 825 and/or user programs 826 (such as networking applications, database applications, etc.). Shared environment 825 contains utilities shared by user programs, and such shared utilities include operating system, device drivers, virtual machines, flow engines, etc., which provide a (common) run time environment for execution of user programs.

Graphics controller 860 generates display signals (e.g., in RGB format) to display unit 870 based on data/instructions received from CPU 810. Display unit 870 contains a display screen to display the images defined by the display signals (such as the portions of the user interface of FIGS. 3A-3C, 4A-4D, 5A-5B, 6 and 7). Input interface 890 may correspond to a keyboard and a pointing device (e.g., touch-pad, mouse) that may be used to provide various inputs (such as selecting the hierarchies, selecting the checkboxes to specify the desired inputs, etc. in the user interfaces of FIGS. 3A-3C, 4A-4D, 5A-5B, 6 and 7). Network interface 880 provides connectivity to a network (e.g., using Internet Protocol), and may be used to communicate with other connected systems (such as server systems 130A-130C, database server 180 or data warehouse 190).

Secondary memory 830 may contain hard drive 835, flash memory 836, and removable storage drive 837. Secondary memory 830 represents a non-transitory medium, which may store the data (for example, portions of data specified using the interfaces of FIGS. 3A-3C, 4A-4D, 5A-5B, 6 and 7) and software instructions (for example, for performing the steps of FIG. 2), to enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of simplifying grouping of data items into a plurality of groups, the data items being stored in a database in the form of rows and columns in respective tables, said method being implemented in a digital processing system, said method comprising:
    displaying a cross product of values from a plurality of columns in the form of a plurality of lines, wherein each line contains a respective value from each of said plurality of columns to specify a corresponding criteria;
    receiving a plurality of inputs, with each input indicating a respective one of said plurality of groups for a corresponding one of said plurality of lines; and
    determining a group of said plurality of groups, for each data item based on said plurality of inputs,
    wherein said digital processing system comprises a processor and a memory, wherein at least one of said displaying, said receiving and said determining is performed by said processor retrieving and executing instructions stored in said memory.

2. The method of claim 1, wherein said plurality of inputs includes a first input indicating a first group for a first line of said plurality of lines, wherein said first line contains a first criteria of respective values from each of said plurality of columns, wherein said determining comprises:
    identifying a first set of data items, with each data item having values satisfying said first criteria for said plurality of columns; and
    including said first set of data items in said first group.

3. The method of claim 2, wherein said database includes a first column for indicating the corresponding group to which each of said data item belongs, said method further comprising:
    storing a first code representing said first group in said first column for each of said first set of data items.

4. The method of claim 3, wherein said first set of data items are stored as a first set of rows in said database, wherein said storing comprises:
    generating a plurality of Structured Query Language (SQL) queries designed to update said first column with said first code for rows satisfying said first criteria; and
    executing said plurality of SQL queries to cause said first column to be updated with said first code for each of said first set of rows, thereby indicating that said first set of data items are included in said first group.

5. The method of claim 1, wherein said displaying displays a two dimensional matrix with said plurality of lines in a first dimension and respective identifiers of said plurality of groups in a second dimension,
  wherein each of said plurality of inputs corresponds to a selection of an intersection of a line and an identifier of a group, wherein said selection indicates that data items satisfying the criteria specified by said line are to be included in said group.

6. The method of claim 5, wherein a respective one of a plurality of computations is associated with each of said plurality of groups,
  wherein said selection indicates that said respective computation for said group is to be performed for data items satisfying the criteria specified by said line.

7. The method of claim 1, wherein a second column of said plurality of columns stores a set of values,
  wherein said displaying further comprises displaying a set of pages corresponding to said set of values, each page containing a corresponding two dimensional matrix with a subset of said plurality of lines in a first dimension and respective identifiers of said plurality of groups in a second dimension, wherein said subset of said plurality of lines in each of said set of pages contains lines having only one of said set of values.

8. The method of claim 1, wherein said plurality of groups contains a plurality of subset of groups,
  wherein displaying further comprises displaying a plurality of pages corresponding to said plurality of subsets of groups, each page containing a corresponding two dimensional matrix with said plurality of lines in a first dimension and only one of said plurality of subsets of groups in a second dimension.

9. A non-transitory machine readable medium storing one or more sequences of instructions for causing a digital processing system to simplify grouping of data items into a plurality of groups, the data items being stored in a database in the form of rows and columns in respective tables, wherein execution of said one or more instructions by one or more processors contained in said digital processing system causes said digital processing system to perform the actions of:
  sending for display a cross product of values from a plurality of columns in the form of a plurality of lines, wherein each line contains a respective value from each of said plurality of columns to specify a corresponding criteria;
  receiving a plurality of inputs, with each input indicating a respective one of said plurality of groups for a corresponding one of said plurality of lines; and
  determining a group of said plurality of groups, for each data item based on said plurality of inputs.

10. The machine readable medium of claim 9, wherein said plurality of inputs includes a first input indicating a first group for a first line of said plurality of lines, wherein said first line contains a first criteria of respective values from each of said plurality of columns, wherein said determining further comprises one or more instructions for:
  identifying a first set of data items, with each data item having values satisfying said first criteria for said plurality of columns; and
  including said first set of data items in said first group.

11. The machine readable medium of claim 10, wherein said database includes a first column for indicating the corresponding group to which each of said data item belongs, further comprising one or more instructions for:
  storing a first code representing said first group in said first column for each of said first set of data items.

12. The machine readable medium of claim 11, wherein said first set of data items are stored as a first set of rows in said database, wherein said storing comprises one or more instructions for:
  generating a plurality of SQL queries designed to update said first column with said first code for rows satisfying said first criteria; and
  executing said plurality of SQL queries to cause said first column to be updated with said first code for each of said first set of rows, thereby indicating that said first set of data items are included in said first group.

13. The machine readable medium of claim 9, wherein said displaying displays a two dimensional matrix with said plurality of lines in a first dimension and respective identifiers of said plurality of groups in a second dimension,
  wherein each of said plurality of inputs corresponds to a selection of an intersection of a line and an identifier of a group, wherein said selection indicates that data items satisfying the criteria specified by said line are to be included in said group.

14. The machine readable medium of claim 13, wherein a respective one of a plurality of computations is associated with each of said plurality of groups,
  wherein said selection indicates that said respective computation for said group is to be performed for data items satisfying the criteria specified by said line.

15. A digital processing system comprising:
  a processor;
  a random access memory (RAM);
  a machine readable medium to store one or more instructions, which when retrieved into said RAM and executed by said processor causes said digital processing system to simplify grouping of data items into a plurality of groups, the data items being stored in a database in the form of rows and columns in respective tables, said digital processing system performing the actions of:
    sending for display, on a display unit, a cross product of values from a plurality of columns in the form of a plurality of lines, wherein each line contains a respective value from each of said plurality of columns to specify a corresponding criteria;
    receiving a plurality of inputs, with each input indicating a respective one of said plurality of groups for a corresponding one of said plurality of lines; and
    determining a group of said plurality of groups, for each data item based on said plurality of inputs.

16. The digital processing system of claim 15, wherein said plurality of inputs includes a first input indicating a first group for a first line of said plurality of lines, wherein said first line contains a first criteria of respective values from each of said plurality of columns, wherein for said determining, said digital processing system performs the actions of:
  identifying a first set of data items, with each data item having values satisfying said first criteria for said plurality of columns; and
  including said first set of data items in said first group.

17. The digital processing system of claim 16, wherein said database includes a first column for indicating the corresponding group to which each of said data item belongs, said digital processing system further performing the actions of:
  storing a first code representing said first group in said first column for each of said first set of data items.

18. The digital processing system of claim 17, wherein said first set of data items are stored as a first set of rows in said database, wherein for said storing, said digital processing systems performs the actions of:

generating a plurality of SQL queries designed to update said first column with said first code for rows satisfying said first criteria; and executing said plurality of SQL queries to cause said first column to be updated with said first code for each of said first set of rows, thereby indicating that said first set of data items are included in said first group.

19. The digital processing system of claim 15, wherein for said displaying, said digital processing system displays a two dimensional matrix with said plurality of lines in a first dimension and respective identifiers of said plurality of groups in a second dimension, wherein each of said plurality of inputs corresponds to a selection of an intersection of a line and an identifier of a group, wherein said selection indicates that data items satisfying the criteria specified by said line are to be included in said group.

20. The digital processing system of claim 19, wherein a respective one of a plurality of computations is associated with each of said plurality of groups, wherein said selection indicates that said respective computation for said group is to be performed for data items satisfying the criteria specified by said line.

* * * * *